US012570209B2

(12) United States Patent
Shim et al.

(10) Patent No.: US 12,570,209 B2
(45) Date of Patent: Mar. 10, 2026

(54) TRANSPARENT LUMINESCENT SHEET AND A LAMP APPARATUS USING THE SAME

(71) Applicants: HYUNDAI MOTOR COMPANY, Seoul (KR); KIA CORPORATION, Seoul (KR); SL Corporation, Daegu (KR)

(72) Inventors: Joon Bo Shim, Seoul (KR); Hye Jin Han, Gyeongsan-si (KR); Young Jun Jeon, Daegu (KR); Cheol Soo Kim, Daegu (KR)

(73) Assignees: HYUNDAI MOTOR COMPANY, Seoul (KR); KIA CORPORATION, Seoul (KR); SL Corporation, Daegu (KR)

( * ) Notice: Subject to any disclaimer, the term of this patent is extended or adjusted under 35 U.S.C. 154(b) by 0 days.

(21) Appl. No.: 18/661,035

(22) Filed: May 10, 2024

(65) Prior Publication Data

US 2025/0178526 A1      Jun. 5, 2025

(30) Foreign Application Priority Data

Dec. 4, 2023    (KR) ......................... 10-2023-0173653

(51) Int. Cl.
| | |
|---|---|
| *B60Q 3/72* | (2017.01) |
| *B60Q 1/30* | (2006.01) |
| *F21V 9/20* | (2018.01) |
| *F21W 106/00* | (2018.01) |
| *F21Y 105/16* | (2016.01) |

(Continued)

(52) U.S. Cl.
CPC ............... *B60Q 3/72* (2017.02); *B60Q 1/302* (2013.01); *F21V 9/20* (2018.02); *F21W*

*2106/00* (2018.01); *F21Y 2105/16* (2016.08); *F21Y 2107/60* (2016.08); *F21Y 2115/10* (2016.08)

(58) Field of Classification Search
CPC .. B60Q 3/72; B60Q 1/302; F21V 9/20; F21Y 2107/60; F21Y 2105/16; F21Y 2115/10; F21W 2106/00
USPC ......................................................... 362/501
See application file for complete search history.

(56) References Cited

U.S. PATENT DOCUMENTS

| | | | |
|---|---|---|---|
| 2003/0169213 A1* | 9/2003 | Spero ....................... | G02B 5/20 |
| | | | 345/7 |
| 2018/0004018 A1* | 1/2018 | Oron ...................... | E06B 3/6722 |
| 2021/0055548 A1* | 2/2021 | Rao ........................ | B60K 35/53 |

(Continued)

FOREIGN PATENT DOCUMENTS

KR        20140050851 A      4/2014

*Primary Examiner* — James R Greece
*Assistant Examiner* — Hana S Featherly
(74) *Attorney, Agent, or Firm* — Lempia Summerfield Katz LLC

(57) ABSTRACT

A transparent luminescent sheet and a lamp apparatus using the same are disclosed. The transparent luminescent sheet realizes a lamp function through emission of light from a sheet thereof configured to be transparent and secures a desired luminous efficacy and a desired freedom of design. In the transparent luminescent sheet, transparency is enhanced in a turn-off state and, as such, visibility is secured at the inside and the outside. A lit image is realized through light during a light emission operation. In addition, light emitted toward the inside is shielded or reduced, thereby preventing indoor dazzling.

15 Claims, 11 Drawing Sheets

(51) Int. Cl.
    *F21Y 107/60*         (2016.01)
    *F21Y 115/10*         (2016.01)

(56)         References Cited

U.S. PATENT DOCUMENTS

2021/0059022 A1*  2/2021  Sadakane ............. B32B 27/281
2022/0097495 A1*  3/2022  Snider ....................... B60J 1/18
2022/0250359 A1*  8/2022  Gima ............... B32B 17/10293

* cited by examiner

TRANSPARENT LUMINESCENT SHEET AND A LAMP APPARATUS USING THE SAME

CROSS-REFERENCE TO THE RELATED APPLICATION

This application claims priority to Korean Patent Application No. 10-2023-0173653, filed on Dec. 4, 2023, the disclosure of which is incorporated herein by reference in its entirety.

TECHNICAL FIELD

The present disclosure relates to a transparent luminescent sheet capable of realizing a lamp function. The present disclosure also relates to a lamp apparatus using the transparent luminescent sheet.

BACKGROUND

An electroluminescent (EL) device such as an inorganic EL device or an organic EL device may realize a high-brightness plane light source through self-luminosity. Accordingly, such an EL device has been practically used as a display or a plane light emitting device having a small thickness and a low weight.

For example, an EL device has a structure in which an EL element is formed through sequential stacking of a transparent electrode layer. The sequential stacking of the transparent electrode layer includes indium tin oxide (ITO) or the like having light transparency. The sequential stacking of the transparent electrode layer also includes a thin-film layer having a luminescent layer. The sequential stacking of the transparent electrode layer also includes a metal electrode layer made of Al or the like having light reflectivity on a transparent substrate made of glass or the like.

Light emitted from the luminescent layer directly passes through the transparent electrode layer or the light passes through the transparent electrode layer after being reflected by the metal electrode layer. Thereafter, the light passes through the transparent substrate and is then output from a boundary surface between the transparent substrate and ambient air, functioning as a light exit surface.

Because such an EL device is visually opaque, freedom of design thereof is low, and luminous efficacy thereof is also low.

The above matters disclosed in this section are merely for enhancement of understanding of the general background of the disclosure and should not be taken as an acknowledgement or any form of suggestion that the matters form the related art already known to a person having ordinary skill in the art.

SUMMARY

The present disclosure has been made in view of the above problems, and it is an object of the present disclosure to provide a transparent luminescent sheet capable of realizing a lamp function through emission of light from a sheet thereof configured to be transparent and securing a desired luminous efficacy and a desired freedom of design. The present disclosure also provides a lamp apparatus using the same.

In accordance with an aspect of the present disclosure, the above and other objects can be accomplished by providing a transparent luminescent sheet. The transparent luminescent sheet includes a first transparent layer and a second transparent layer having transparency. The transparent luminescent sheet also includes an electrode layer stacked on the first transparent layer. The electrode layer has conductivity and includes a luminescent structure. The transparent luminescent sheet also includes a clear layer having transparency and being stacked to cover the electrode layer such that the clear layer is filled between the electrode layer and the second transparent layer.

The first transparent layer and the second transparent layer may be made of polyethylene terephthalate (PET).

The electrode layer may include an electrode made of a Cu material and deposited to form a pattern.

The pattern may have a mesh shape.

The electrode layer may be formed with a land in accordance with a black oxide treatment through a photo process, to dispose the luminescent structure on the land.

The luminescent structure may include a light emitting diode (LED) and may be connected to an electrode of the electrode layer through soldering in a state of being seated on the land.

The clear layer may be made of an optically clear resin (OCR) or an optically clear adhesive (OCA).

A dichroic film configured to allow light of a particular wavelength range or a particular color range to pass therethrough may be provided at a side of the first transparent layer or the second transparent layer opposite to a direction in which light is emitted from the luminescent structure.

The first transparent layer or the second transparent layer provided with the dichroic film may be divided into a plurality of areas. Light beams allowed to pass through the plurality of areas may be set to have different wavelength ranges or different color ranges, respectively.

The transparent luminescent sheet may be configured in plural such that a plurality of transparent luminescent sheets is bonded to one another to form a multilayer stack structure. Respective luminescent structures of the plurality of transparent luminescent sheets may be individually turned on/off to realize a 3D lit image.

In accordance with another aspect of the present disclosure, a lamp apparatus disposed to be spaced apart from a rear windshield of a vehicle includes a bezel fixed to a body of the vehicle and a transparent luminescent sheet. The transparent luminescent sheet includes a first transparent layer and a second transparent layer having transparency. The transparent luminescent sheet also includes an electrode layer stacked on the first transparent layer while the electrode layer has conductivity and includes a luminescent structure. The transparent luminescent sheet also includes a clear layer having transparency and being stacked to cover the electrode layer such that the clear layer is filled between the electrode layer and the second transparent layer. The lamp apparatus also includes a lens fixed to the bezel and surrounding the transparent luminescent sheet.

A heating wire may be provided at the rear windshield. The transparent luminescent sheet may be disposed such that the luminescent structure is matched with the heating wire.

The lens may be made of an optically clear resin (OCR) or an optically clear adhesive (OCA).

In accordance with a further aspect of the present disclosure, a lamp apparatus includes a transparent luminescent sheet provided at a body of a mobility apparatus. The body includes a seating space and a transparent portion configured to close the seating space. The transparent luminescent sheet is provided at the seating space and includes a first transparent layer and a second transparent layer having transparency. The transparent luminescent sheet also includes an electrode layer stacked on the first transparent layer. The electrode layer has conductivity and includes a luminescent structure. The transparent luminescent sheet also includes clear layer having transparency being stacked to cover the electrode layer such that the clear layer is filled between the electrode layer and the second transparent layer.

In accordance with a further aspect of the present disclosure, a lamp apparatus includes a transparent luminescent sheet provided at a windshield of a mobility apparatus. The transparent luminescent sheet includes a first transparent layer and a second transparent layer having transparency. The transparent luminescent sheet also includes an electrode layer stacked on the first transparent layer. The electrode layer has conductivity and includes a luminescent structure. The transparent luminescent sheet includes a clear layer having transparency and being stacked to cover the electrode layer such that the clear layer is filled between the electrode layer and the second transparent layer. The first transparent layer is bonded to the windshield.

A light shield configured to shield light may be provided at the second transparent layer.

In the transparent luminescent sheet having the above-described configuration and the lamp apparatus using the same, light is emitted from the transparent luminescent sheet configured to be transparent and, as such, a lamp function may be realized. It may also be possible to achieve an enhancement in luminous efficacy and to secure a desired freedom of design.

In addition, transparency is enhanced in a turn-off state and, as such, visibility is secured.

Furthermore, a lit image may be realized through light during a light emission operation. In addition, light emitted toward the inside is shielded or reduced, thereby preventing indoor dazzling.

BRIEF DESCRIPTION OF THE DRAWINGS

The above and other objects, features, and other advantages of the present disclosure should be more clearly understood from the following detailed description taken in conjunction with the accompanying drawings, in which.

Figure 1:
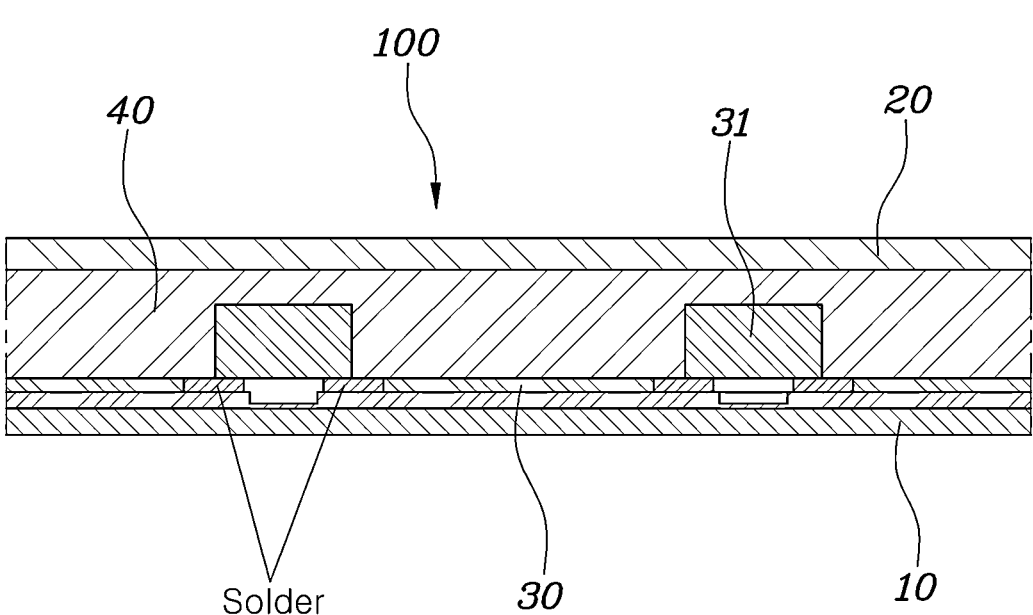
FIG. 1 is a view showing a transparent luminescent sheet according to an embodiment of the present disclosure.

The drawings described herein are for illustration purposes only and are not intended to limit the scope of the present disclosure in any way.

DETAILED DESCRIPTION

Hereinafter, embodiments of the present disclosure are described in detail with reference to the accompanying drawings. Same or similar elements are designated by the same reference numerals regardless of the numerals in the drawings, and redundant description thereof has been omitted.

The suffixes "module" and "unit" of elements herein are used for convenience of description and thus can be used interchangeably and do not have any distinguishable meanings or functions. When a component, device, element, or the like of the present disclosure is described as having a purpose or performing an operation, function, or the like, the component, device, or element should be considered herein as being "configured to" meet that purpose or to perform that operation or function.

In the following description of the embodiments of the present disclosure, a detailed description of known functions and configurations incorporated herein has been omitted when the detailed description may obscure the subject matter of the embodiments of the present disclosure. In addition, the embodiments of the present disclosure should be more clearly understood from the accompanying drawings and should not be limited by the accompanying drawings. It should be appreciated that all changes, equivalents, and substitutes that do not depart from the spirit and technical scope of the present disclosure are encompassed in the present disclosure.

It should be understood that, although the terms "first," "second," etc. may be used herein to describe various elements, these elements should not be limited by these terms. These terms are only used to distinguish one element from another.

In the case where an element is "connected" or "linked" to another element, it should be understood that the element may be directly connected or linked to the other element, or another element may be present therebetween. Conversely, in the case where an element is "directly connected" or "directly linked" to another element, it should be understood that no other element is present therebetween.

Unless clearly used otherwise, singular expressions include a plural meaning.

In this specification, the term "comprising," "including," or the like is intended to express the existence of the characteristic, the numeral, the step, the operation, the element, the part, or the combination thereof. The term does not exclude another characteristic, numeral, step, operation, element, part, any combination thereof, or any addition thereto.

Hereinafter, a transparent luminescent sheet according to an embodiment of the present disclosure and a lamp apparatus using the same are described with reference to the accompanying drawings.

As shown in FIG. 1, a transparent luminescent sheet 100 according to an embodiment of the present disclosure includes a first transparent layer 10 and a second transparent layer 20 having transparency. The transparent luminescent sheet 100 also includes an electrode layer 30 stacked on the first transparent layer 10 and having conductivity. The electrode layer 30 includes a luminescent structure 31. The transparent luminescent sheet 100 also includes a clear layer 40 having transparency and being stacked to cover the electrode layer 30 such that the clear layer 40 is filled between the electrode layer 30 and the second transparent layer 20.

The first transparent layer 10 and the second transparent layer 20 are made of a transparent material, thereby having light transparency.

The first transparent layer 10 and the second transparent layer 20 as described above may be disposed at a lower end and an upper end of the transparent luminescent sheet 100, respectively. The first transparent layer 10 and the second transparent layer 20 may be made of an acryl-based composition capable of being photo-cured or heat-cured and exhibiting excellent surface hardness.

For example, the first transparent layer 10 and the second transparent layer 20 may be made of polyethylene terephthalate (PET). A PET film may secure transparency and may be easily produced. In particular, such a PET film has a low coefficient of thermal expansion and, as such, may prevent generation of cracks at the electrode layer 30 due to heat.

The first transparent layer 10 and the second transparent layer 20 as described above may be made of polyethylene naphthalate (PEN) or polycarbonate (PC) rather than PET. Of course, although a PEN material exhibits high heat resistance, the PEN material is expensive. A PC material may be used only in a limited temperature range. For this reason, it is desirable that the first transparent layer 10 and the second transparent layer 20 may be made of a PET material.

As described above, the electrode layer 30 is stacked on the first transparent layer 10, has conductivity, and includes the luminescent structure 31.

Because the electrode layer 30 has conductivity, as described above, it may be possible to supply electric power to the luminescent structure 31, which is fixed. The electrode layer 30 may also be configured to allow light to pass therethrough.

To this end, the electrode layer 30 includes an electrode 32 made of a Cu material and deposited to form a pattern. The electrode layer 30 may be made of a Cu material and may be configured to have a width of 0.25 μm. Although the electrode layer 30 may be made of various materials such as Ag, Au, Ti, etc., it is desirable that the electrode layer 30 be made of a Cu material capable of securing a desired electric energy efficiency and reducing costs.

Figure 2:
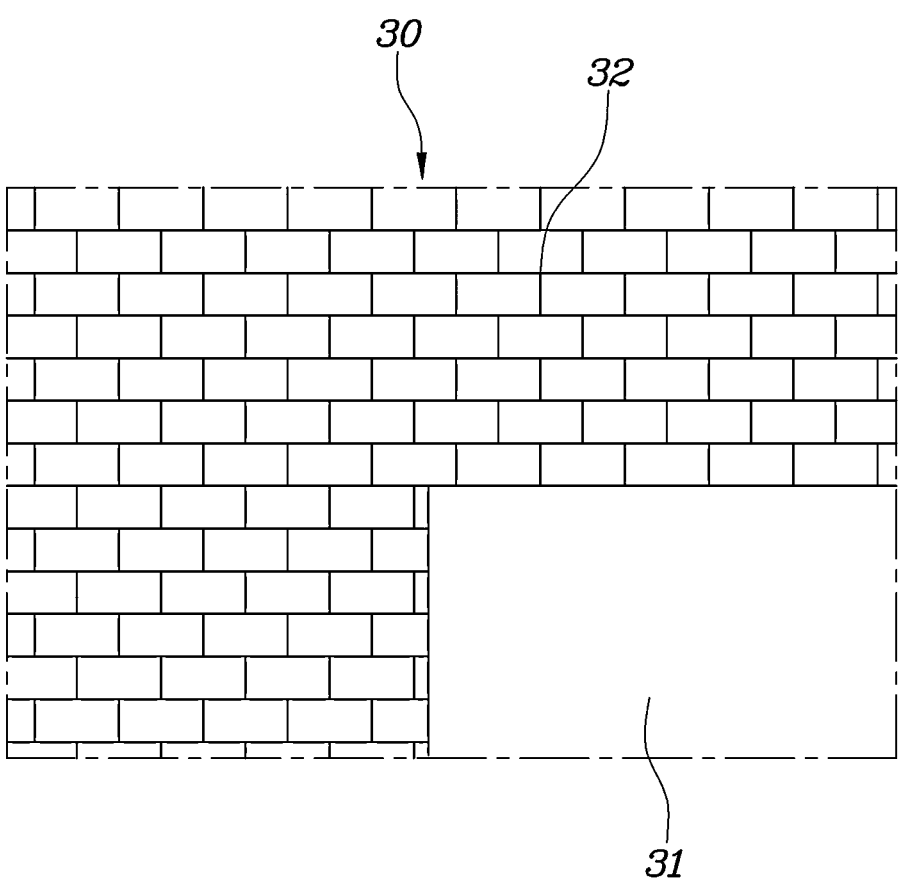
FIG. 2 is a view showing an electrode pattern of an electrode layer in the transparent luminescent sheet according to the embodiment of the present disclosure.

In addition, as shown in FIG. 2, the Cu electrode 32 of the electrode layer 30 may be formed to have a mesh pattern. In other words, the electrode 32 made of a Cu material may be formed such that portions thereof intersect one another in the form of a mesh or a net. As the electrode 32 is configured to have a mesh shape, as described above, uniform transparency may be obtained throughout the electrode 32. It may also be possible to achieve uniform electric power transmission over the entire surface of the electrode 32. Accordingly, heat generated at the electrode 32 may be uniformly distributed over the entire surface of the electrode 32 and, as such, an enhancement in heat resistance performance may be achieved. In addition, although breakage or deformation may occur at a part of the electrode portions of the electrode 32 when the electrode 32 is used for a long time, the function of the electrode 32 may be maintained through the remaining electrode portions.

Thus, the electrode 32 may be formed with a plurality of through holes and may be deposited on the first transparent layer 10 in the form of a lattice. The Cu electrode 32 as described above may be formed to have various shapes without being limited to a mesh shape.

The electrode layer 30 as described above is subjected to black oxide treatment through a photo process and, as such, a land 33, on which the luminescent structure 31 is provided, may be formed.

In addition, the luminescent structure 31 may be constituted by a light emitting diode (LED) and may be connected to the electrode 32 through soldering in a state of being seated on the land 33.

Figure 3:
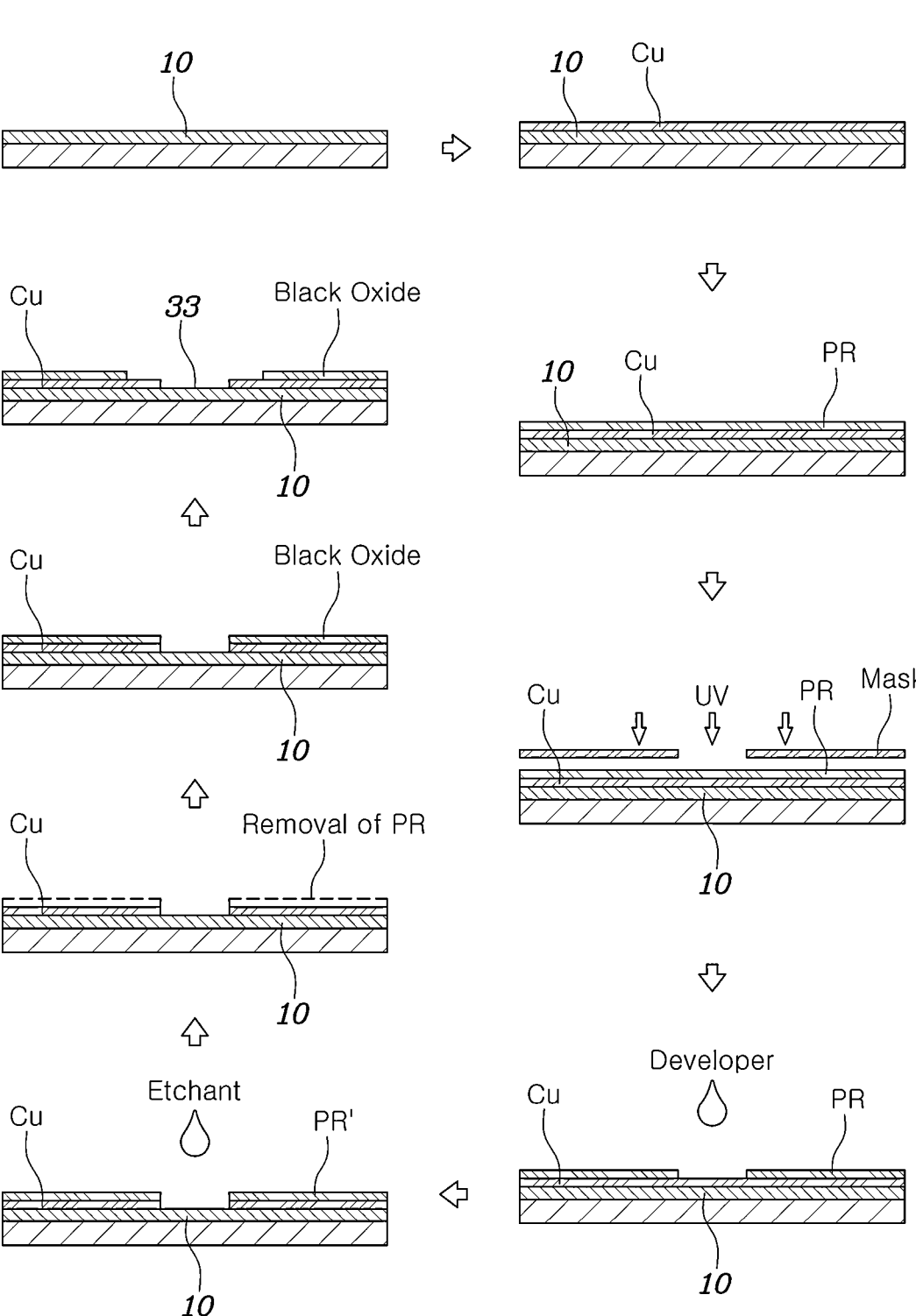
FIG. 3 is a view showing a process of manufacturing the transparent luminescent sheet according to the embodiment of the present disclosure.

Hereinafter, a procedure for forming the electrode 32 on the electrode layer 30 is described with reference to FIG. 3. Referring to FIG. 3, Cu is deposited on the first transparent layer 10. Here, deposition of Cu on the first transparent layer 10 may be carried out through a deposition method according to physical vapor deposition (PVD).

Thereafter, a photoresist (PR) layer is coated through a PR process. Subsequently, a mask for formation of the land 33 is seated, and light exposure is then carried out.

The light-exposed PR layer is developed by a developer and is then subjected to an etching process using an etchant. Thereafter, the PR layer is removed, and addition of a black oxide and an oxidizing agent is performed and, as such, a light shielding layer is formed.

Thus, the electrode layer 30 has transparency and conductivity and is formed with the land 33 on which the luminescent structure 31 may be provided.

Figure 4:
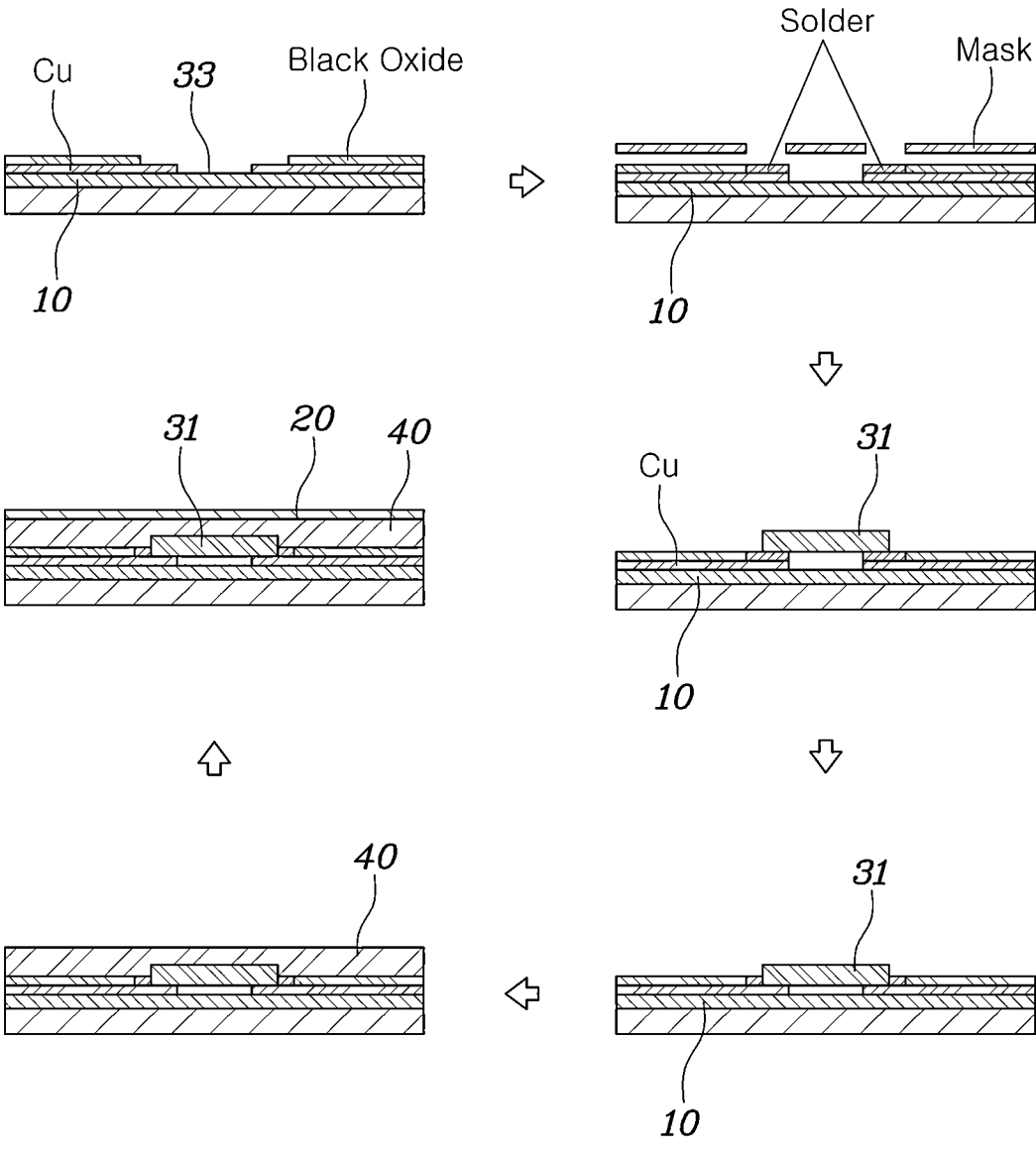
FIG. 4 is a view showing the process of manufacturing the transparent luminescent sheet according to the embodiment of the present disclosure.

After formation of the first transparent layer 10 and the electrode layer 30 is completed, a mask is matched with the electrode layer 30, and a soldering process is then performed, as shown in FIG. 4. In other words, a melted solder is formed at the land 33 of the electrode layer 30, and the luminescent structure 31 is then fixed to the land 33 by means of the solder in a state of being seated on the land 33.

The luminescent structure 31 may be constituted by an LED. A mini-LED may also be applied to the luminescent structure 31, for an increase in transparency.

Through the above process, the luminescent structure 31 may be coupled to the electrode layer 30. A plurality of luminescent structures 31 may be fixed in a seated state through the above process.

The electrode layer 30 as described above may be covered by the clear layer 40. The clear layer 40 is stacked to cover the electrode layer 30 and, as such, is filled between the electrode layer 30 and the second transparent layer 20.

The clear layer 40 may be made of a material having light transparency. In other words, the clear layer 40 may be made of an optically clear resin (OCR) or an optically clear adhesive (OCA) and may be filled between the electrode layer 30 and the second transparent layer 20. Thus, breakage of the luminescent structure 31 caused by external influence may be prevented, and an enhancement in luminous efficacy may be achieved.

In other words, because the clear layer 40 is made of an OCR or an OCA, reflection of a part of light passing through a boundary surface of the second transparent layer 20 or the electrode layer 30 may be reduced and, as such, light transparency may be enhanced. As a result, transparency of the transparent luminescent sheet 100 may be secured, and clarity of light emitted from the luminescent structure 31 may be enhanced.

Figure 5:
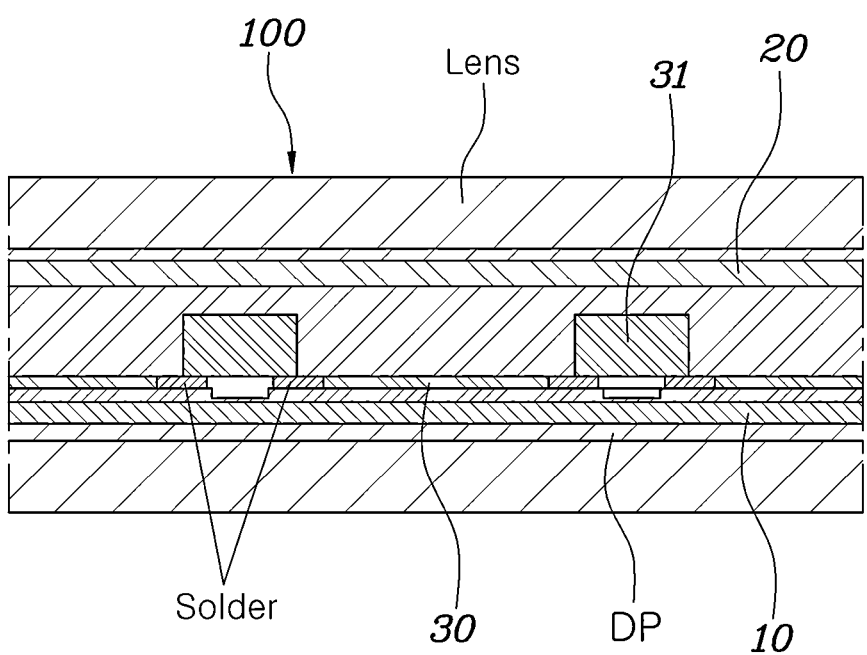
FIG. 5 is a view showing a transparent luminescent sheet according to another embodiment of the present disclosure.

Meanwhile, as shown in FIG. 5, a dichroic film DP configured to allow light of a particular wavelength range or a particular color range to pass therethrough may be provided at a side of the first transparent layer 10 or the second transparent layer 20 opposite to a direction in which light is emitted from the luminescent structure 31.

In accordance with the embodiment of the present disclosure, the luminescent structure 31 is provided to emit light toward the second transparent layer 20 and, as such, the dichroic film DP may be provided at a back surface or a lower surface of the first transparent layer 10.

The dichroic film DP described above may be configured to allow light of a particular wavelength range to pass therethrough and reflect light of other wavelength ranges. Alternatively, the dichroic film DP described above may be configured to allow light of a particular color to pass therethrough while reflecting light of other colors.

For example, when the dichroic film DP is configured to reflect only light of red, light of red emitted from the luminescent structure 31 is output only through the second transparent layer 20, and light of other colors moves through the first transparent layer 10.

Accordingly, the transparent luminescent sheet 100 according to the embodiment of the present disclosure may be configured such that light emitted from the luminescent structure 31 is output to an outside but is not introduced into an inside.

In addition, the first transparent layer 10 constituted by the dichroic film DP may be divided into a plurality of areas, and light beams allowed to pass through respective areas may be set to have different wavelength ranges or different color ranges, respectively.

The dichroic film DP may be configured to allow light beams of different wavelength ranges or different colors to pass through different areas thereof, respectively. As such, different colors may be formed in different areas of the dichroic film DP, respectively. Thus, the transparent luminescent sheet 100 may set various designs in accordance with various colors and may have different light emission ranges. Thus, various images may be realized.

Figure 6:
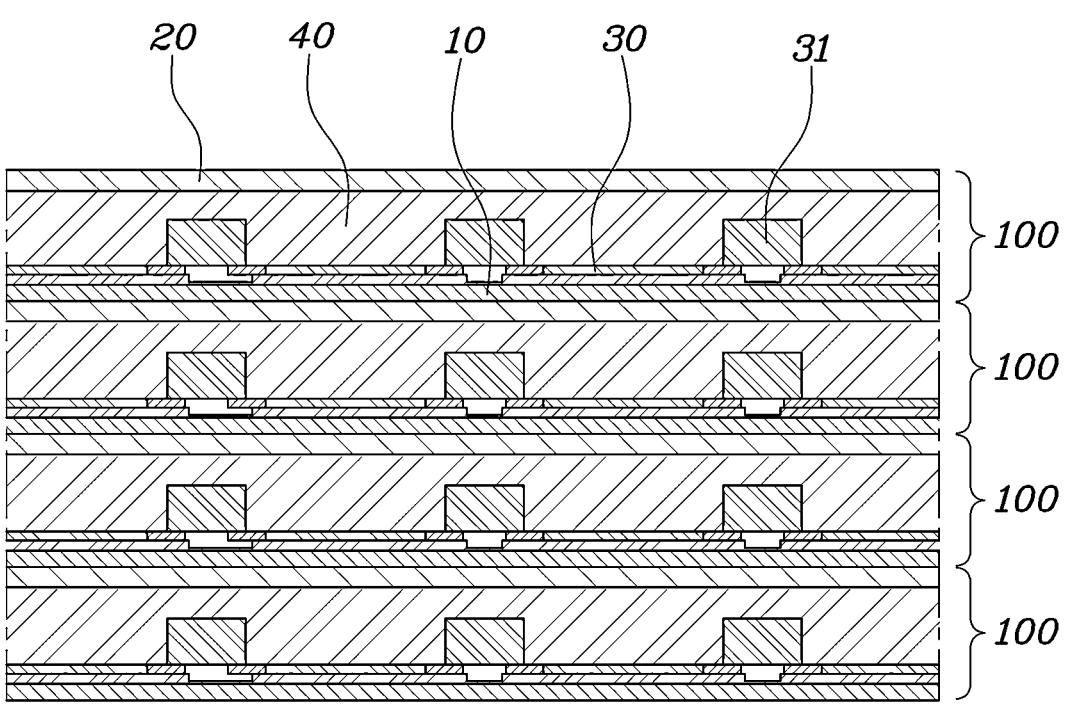
FIG. 6 is a view showing a transparent luminescent sheet according to another embodiment of the present disclosure.
Figure 7:
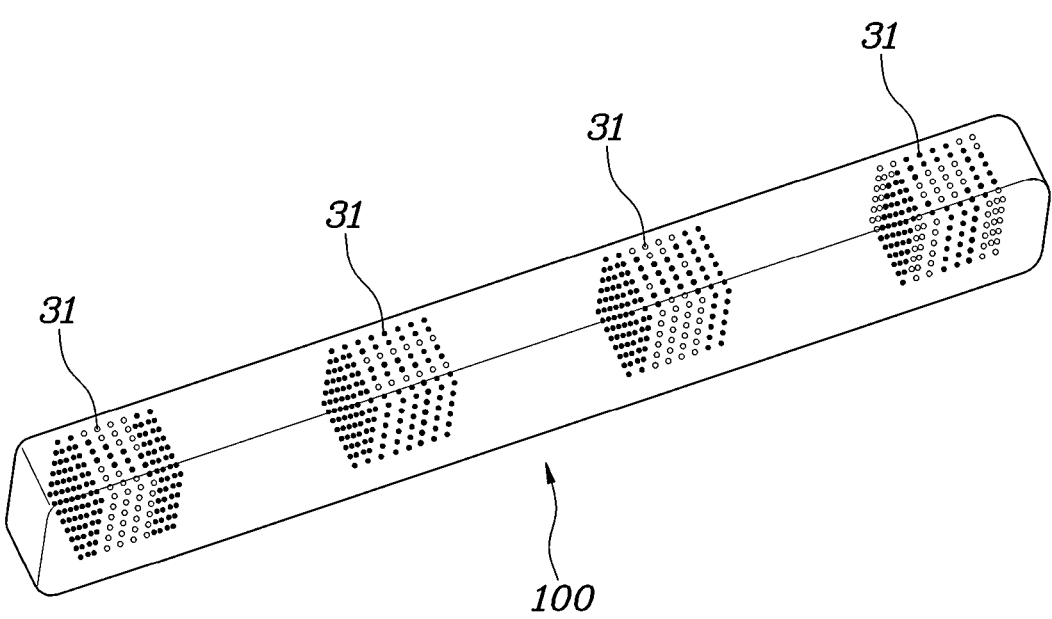
FIG. 7 is a view showing an example of the transparent luminescent sheet according to the embodiment shown in FIG. 6.

Meanwhile, as shown in FIGS. 6 and 7, the transparent luminescent sheet 100 may be configured in plural such that a plurality of transparent luminescent sheets 100 is bonded to one another to form a multilayer stack structure. In this case, respective luminescent structures 31 of the plurality of transparent luminescent sheets 100 are individually turned on/off and, as such, a 3D lit image may be realized.

As the plurality of transparent luminescent sheets 100 is bonded to one another to form a multilayer stack structure, the luminescent structures 31 thereof are disposed to be spaced apart from one another in a stacking direction.

In addition, each luminescent structure 31 is configured to be individually turned on/off. Accordingly, the luminescent structures 31 respectively disposed at different positions may be selectively turned on/off and, as such, may realize various lit images.

For example, as shown in FIG. 7, the plurality of transparent luminescent sheets 100 may be configured such that the luminescent structures 31 are grouped in a stacking direction, in order to realize a 3D lit image when the grouped luminescent structures 31 realize the same image.

In association with realization of a lit image, the lit image may include a 3D lit image in accordance with the present disclosure. Thus, realization of various lit images may be achieved.

Figure 8:
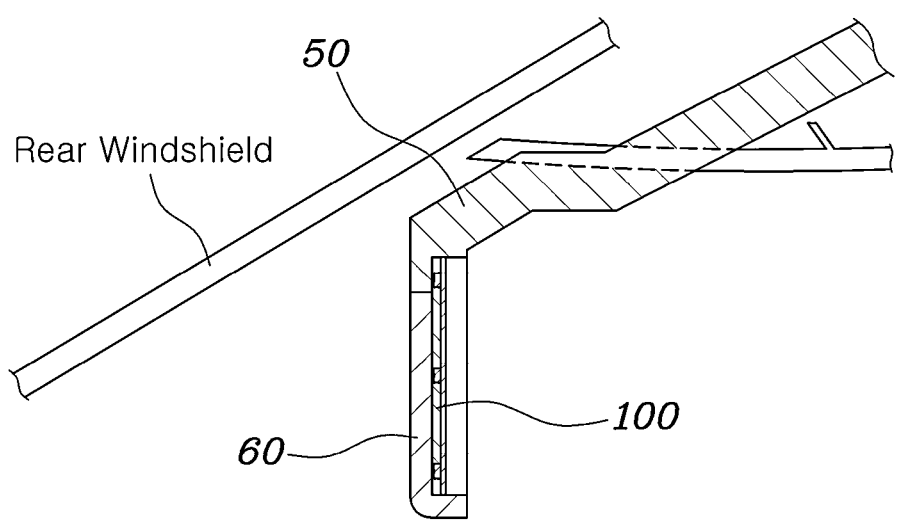
FIG. 8 is a view showing a lamp apparatus to which the transparent luminescent sheet of the present disclosure is applied in accordance with an embodiment of the present disclosure.
Figure 9:
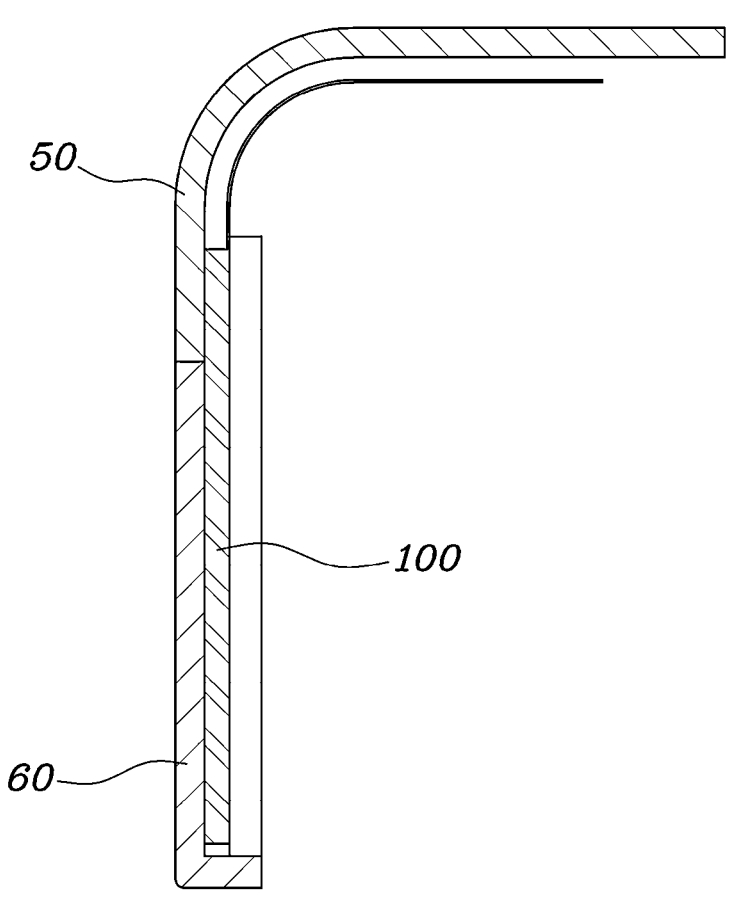
FIG. 9 is a view explaining the lamp apparatus shown in FIG. 8.

Meanwhile, as shown in FIGS. 8 and 9, a lamp apparatus, to which the transparent luminescent sheet 100 according to the embodiment of the present disclosure is applied, may be installed to be spaced apart from a rear windshield 80 of a vehicle.

In detail, the lamp apparatus may include a bezel 50 fixed to a body of the vehicle, a transparent luminescent sheet 100 including a first transparent layer 10 and a second transparent layer 20 having transparency. The transparent luminescent sheet 100 also includes an electrode layer 30 stacked on the first transparent layer 10 and having conductivity. The electrode layer 30 also includes a luminescent structure 31. The transparent luminescent sheet 100 also includes a clear layer 40 having transparency and being stacked to cover the electrode layer 30 such that the clear layer 40 is filled between the electrode layer 30 and the second transparent layer 20. The lamp apparatus may also include a lens 60 fixed to the bezel 50 and surrounding the transparent luminescent sheet 100.

The bezel 50 is fixed to the vehicle body such that the transparent luminescent sheet 100 and the lens 60 are disposed at particular positions and are spaced apart from the rear windshield 80, respectively.

The transparent luminescent sheet 100 is fixed to the bezel 50 and comprises the first transparent layer 10, the second transparent layer 20, the electrode layer 30, and the clear layer 40.

The first transparent layer 10 and the second transparent layer 20 may be made of polyethylene terephthalate (PET).

The electrode layer 30 is configured such that an electrode 32 thereof made of a Cu material is formed to have a predetermined pattern and, as such, has conductivity. Accordingly, it may be possible to supply electric power to the luminescent structure 31, which is fixed. The electrode layer 30 may also be configured to allow light to pass therethrough. In this case, the luminescent structure 31 may be constituted by an LED.

The clear layer 40 may be made of a material having light transparency. In other words, the clear layer 40 may be made of an optically clear resin (OCR) or an optically clear adhesive (OCA) and may be filled between the electrode layer 30 and the second transparent layer 20. Thus, breakage of the luminescent structure 31 caused by external influence may be prevented, and an enhancement in luminous efficacy may be achieved.

The lens 60 is fixed to the bezel 50 and is provided to surround the transparent luminescent sheet 100. The lens 60 described above may be made of an optically clear resin (OCR) or an optically clear adhesive (OCA) and thus may protect the transparent luminescent sheet 100 from an outside.

Because the lamp apparatus is provided in an indoor of the vehicle to be spaced apart from the rear windshield 80 in accordance with the present disclosure, a passenger may observe an exterior of the vehicle through the lamp apparatus and, as such, may secure exterior visibility of the vehicle.

In addition, in the lamp apparatus, the luminescent structure 31 is turned on in accordance with a situation and, as such, may transmit various messages such as breaking, direction indication, or the like through a lit image.

Meanwhile, a heating wire may be provided at the rear windshield 80. In this case, the transparent luminescent sheet 100 may be disposed such that the luminescent structure 31 is matched with the heating wire.

The transparent luminescent sheet 100 according to the embodiment of the present disclosure is configured to be transparent and, as such, the luminescent structure 31 may be observed by the naked eye due to characteristics thereof.

Although the luminescent structure 31 is not clearly observed by the naked eye due to a small size thereof, sense of heterogeneity may be visually exhibited.

To this end, the luminescent structure 31 of the transparent luminescent sheet 100 is matched with the heating wire provided at the rear windshield 80 in order to prevent the luminescent structure 31 from being visually viewed.

Figure 10:
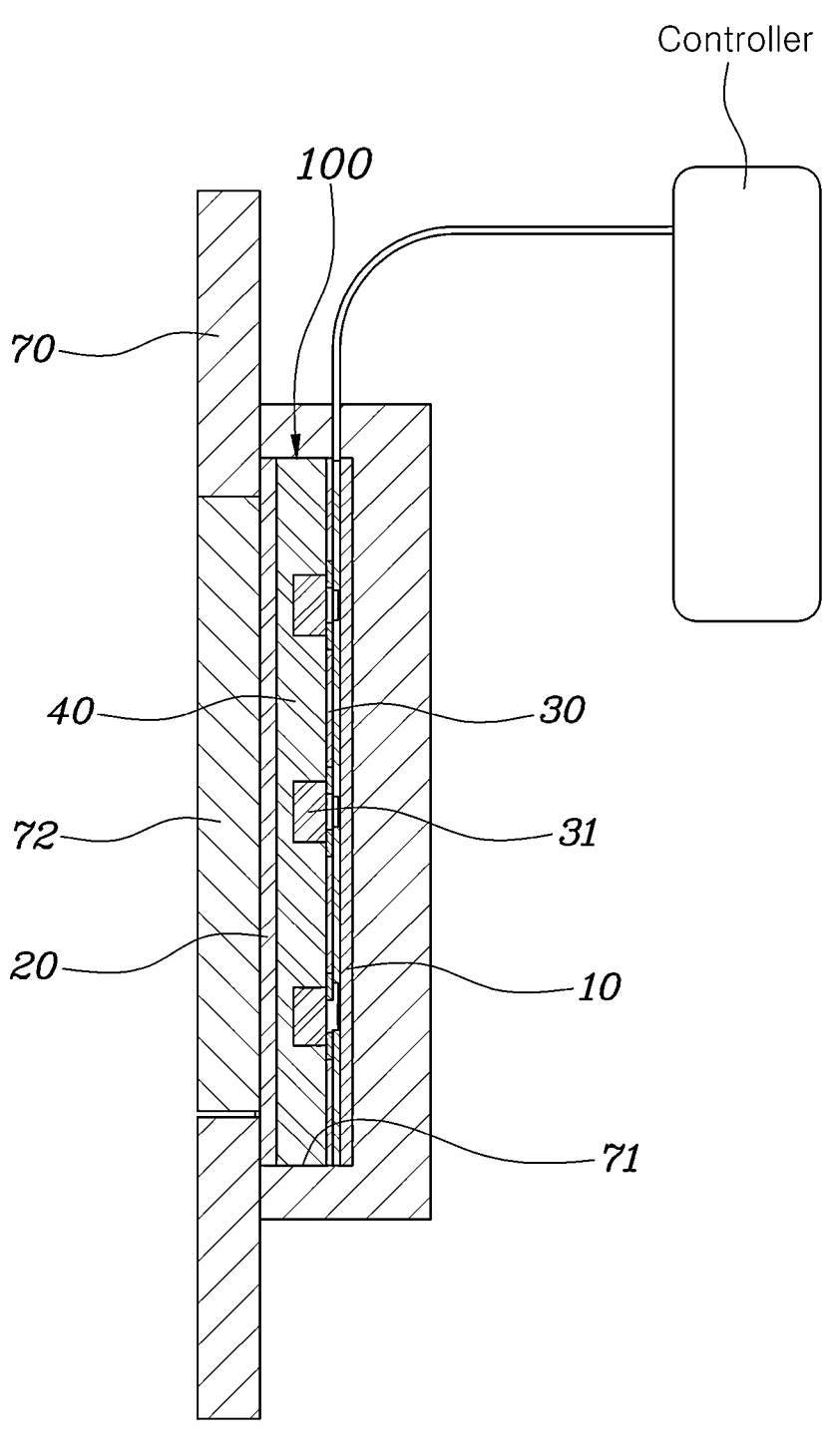
FIG. 10 a view showing a lighting apparatus to which the transparent luminescent sheet of the present disclosure is applied in accordance with an embodiment of the present disclosure.

Meanwhile, as shown in FIG. 10, a lamp apparatus including a transparent luminescent sheet may be provided at a body 70 of a mobility apparatus.

In this case, the body 70 may be an indoor interior of a vehicle. The body 70 is formed with a seating space 71 and a transparent portion 72 configured to close the seating space 71. The transparent luminescent sheet is provided at the seating space 71.

The transparent luminescent sheet may be a transparent luminescent sheet 100 provided at the seating space 71. The transparent luminescent sheet 100 includes a first transparent layer 10 and a second transparent layer 20 having transparency. The transparent luminescent sheet 100 includes an electrode layer 30 stacked on the first transparent layer 10 and having conductivity. The electrode layer 30 includes a luminescent structure 31. The transparent luminescent sheet 100 includes a clear layer 40 having transparency and being stacked to cover the electrode layer 30 such that the clear layer 40 is filled between the electrode layer 30 and the second transparent layer 20.

The transparent luminescent sheet 100 is fixed to a bezel 50 and includes the first transparent layer 10, the second transparent layer 20, the electrode layer 30, and the clear layer 40.

The first transparent layer 10 and the second transparent layer 20 may be made of polyethylene terephthalate (PET).

The electrode layer 30 is configured such that an electrode 32 thereof made of a Cu material is formed to have a predetermined pattern and, as such, has conductivity. Accordingly, it may be possible to supply electric power to the luminescent structure 31, which is fixed. The electrode layer 30 may also be configured to allow light to pass therethrough. In this case, the luminescent structure 31 may be constituted by an LED.

The clear layer 40 may be made of a material having light transparency. In other words, the clear layer 40 may be made of an optically clear resin (OCR) or an optically clear adhesive (OCA) and may be filled between the electrode layer 30 and the second transparent layer 20. Thus, breakage of the luminescent structure 31 caused by external influence may be avoided or prevented, and an enhancement in luminous efficacy may be achieved.

The transparent portion 72 of the body 70 may be made of an optically clear resin (OCR) or an optically clear adhesive (OCA) in order to protect the transparent luminescent sheet 10 from an outside.

Through the above-described configuration, in a state in which the luminescent structure 31 of the transparent luminescent sheet 100 is turned off, the transparent luminescent sheet 100 and the transparent portion 72 are not viewed from the inside, and only the body 70 is viewed from the inside. When the luminescent structure 31 of the transparent luminescent sheet 100 is turned on, a lit image may be realized by the luminescent structure 31. Accordingly, an interior design may be enhanced. It may also be possible to provide luxury interior lighting through selective turn-on/off operation of the transparent luminescent sheet 100.

Figure 11:
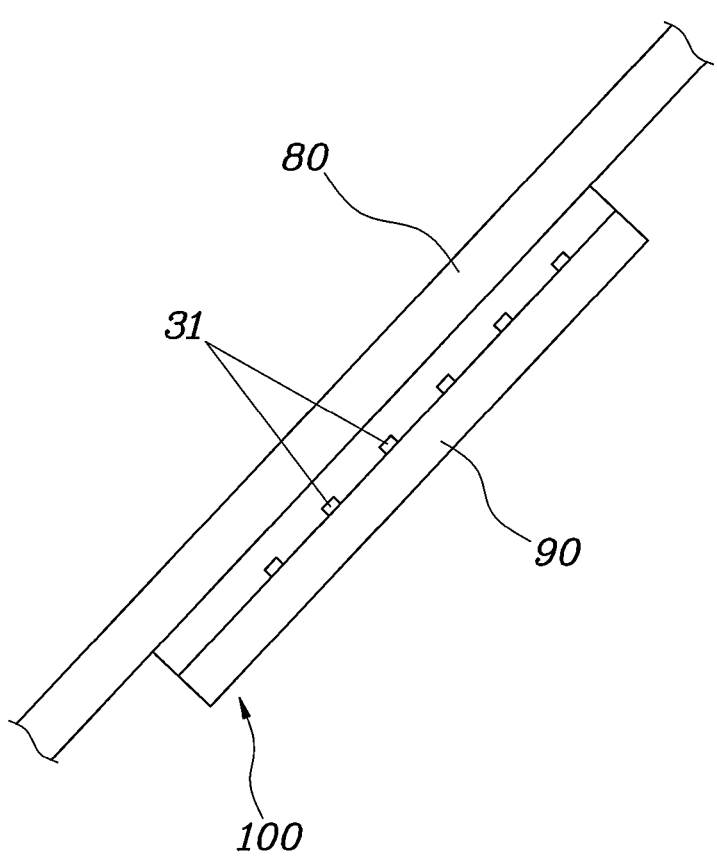
FIG. 11 is a view showing a lamp apparatus to which the transparent luminescent sheet of the present disclosure is applied in accordance with another embodiment of the present disclosure.

Meanwhile, as shown in FIG. 11, a lamp apparatus including a transparent luminescent sheet 100 may be provided at a windshield 80 of a mobility apparatus.

In this case, the transparent luminescent sheet 100 may include a first transparent layer 10 and a second transparent layer 20 having transparency. The transparent luminescent sheet 100 may also include an electrode layer 30 stacked on the first transparent layer 10 and having conductivity. The electrode layer 30 includes a luminescent structure 31. The transparent luminescent sheet 100 may also include a clear layer 40 having transparency and being stacked to cover the electrode layer 30 such that the clear layer 40 is filled between the electrode layer 30 and the second transparent layer 20.

In particular, the first transparent layer 10 is bonded to the windshield 80 such that the first transparent layer 10 is integrated with the windshield 80. Accordingly, the lamp apparatus may secure a field of view through the windshield 80 and the transparent luminescent sheet 100 at the inside and the outside.

In this case, when the luminescent structure 31 of the transparent luminescent sheet 100 is turned on, a message through a lit image may be transmitted.

Meanwhile, a light shield 90 configured to shield light may be provided at the second transparent layer 20. In accordance with the light shield 90, it may be possible to allow light emitted from the luminescent structure 31 to be output to the outside and prevent light emitted from the luminescent structure 31 from being introduced into the inside.

The light shield 90 may be constituted by a dichroic film.

As apparent from the above description, in the transparent luminescent sheet 100 having the above-described configuration and the lamp apparatus using the same, light is emitted from the transparent luminescent sheet configured to be transparent and, as such, a lamp function may be realized. It may also be possible to achieve an enhancement in luminous efficacy and to secure a desired freedom of design.

In addition, transparency is enhanced in a turn-off state and, as such, visibility is secured.

Furthermore, a lit image may be realized through light during a light emission operation. In addition, light emitted toward the inside is shielded or reduced, and thus indoor dazzling may be prevented.

Although the embodiments of the present disclosure have been disclosed for illustrative purposes, those having ordinary skill in the art should appreciate that various modifications, additions, and substitutions are possible, without departing from the scope and spirit of the present disclosure.

What is claimed is:

1. A transparent luminescent sheet, comprising:
a first transparent layer and a second transparent layer having transparency;
an electrode layer stacked on the first transparent layer, the electrode layer having conductivity and comprising a luminescent structure; and
a clear layer having transparency and being stacked to cover the electrode layer such that the clear layer is filled between the electrode layer and the second transparent layer,
wherein a part of the electrode layer is subjected to an etching process to expose a part of the first transparent layer, and
wherein the electrode layer is formed with a land in accordance with a black oxide treatment through a photo process, to dispose the luminescent structure on the land above the exposed part of the first transparent layer.

2. The transparent luminescent sheet according to claim 1, wherein the first transparent layer and the second transparent layer are made of polyethylene terephthalate (PET).

3. The transparent luminescent sheet according to claim 1, wherein the electrode layer comprises an electrode made of a Cu material and deposited to form a pattern.

4. The transparent luminescent sheet according to claim 3, wherein the pattern has a mesh shape.

5. The transparent luminescent sheet according to claim 1, wherein the luminescent structure comprises a light emitting diode (LED) and is connected to an electrode of the electrode layer through soldering in a state of being seated on the land.

6. The transparent luminescent sheet according to claim 1, wherein the clear layer is made of an optically clear resin (OCR) or an optically clear adhesive (OCA).

7. The transparent luminescent sheet according to claim 1, wherein a dichroic film configured to allow light having a particular wavelength range or a particular color range to pass therethrough is provided at a side of the first transparent layer or the second transparent layer opposite to a direction in which light is emitted from the luminescent structure.

8. The transparent luminescent sheet according to claim 7, wherein the first transparent layer or the second transparent layer provided with the dichroic film is divided into a plurality of areas, and
   wherein light beams allowed to pass through the plurality of areas are set to have different wavelength ranges or different color ranges, respectively.

9. The transparent luminescent sheet according to claim 1, wherein:
   the transparent luminescent sheet is configured in plural such that a plurality of transparent luminescent sheets is bonded to one another to form a multilayer stack structure, and
   respective luminescent structures of the plurality of transparent luminescent sheets are individually turned on and off to realize a 3D lit image.

10. A lamp apparatus, disposed to be spaced apart from a rear windshield of a vehicle, the lamp apparatus comprising:
   a bezel fixed to a body of the vehicle;
   a transparent luminescent sheet, comprising:
      a first transparent layer and a second transparent layer having transparency;
      an electrode layer stacked on the first transparent layer, the electrode layer having conductivity and comprising a luminescent structure; and
      a clear layer having transparency and being stacked to cover the electrode layer such that the clear layer is filled between the electrode layer and the second transparent layer; and
   a lens fixed to the bezel and surrounding the transparent luminescent sheet,
   wherein a part of the electrode layer is subjected to an etching process to expose a part of the first transparent layer, and
   wherein the electrode layer is formed with a land in accordance with a black oxide treatment through a photo process, to dispose the luminescent structure on the land above the exposed part of the first transparent layer.

11. The lamp apparatus according to claim 10, wherein:
   a heating wire is provided at the rear windshield, and
   the transparent luminescent sheet is disposed such that the luminescent structure is matched with the heating wire.

12. The lamp apparatus according to claim 10, wherein the lens is made of an optically clear resin (OCR) or an optically clear adhesive (OCA).

13. A lamp apparatus, comprising a transparent luminescent sheet provided at a body of a mobility apparatus, wherein:
   the body comprises a seating space and a transparent portion configured to close the seating space, and
   the transparent luminescent sheet is provided at the seating space and comprises:
      a first transparent layer and a second transparent layer having transparency;
      an electrode layer stacked on the first transparent layer, the electrode layer having conductivity and comprising a luminescent structure; and
      a clear layer having transparency and being stacked to cover the electrode layer such that the clear layer is filled between the electrode layer and the second transparent layer,
   wherein a part of the electrode layer is subjected to an etching process to expose a part of the first transparent layer, and
   wherein the electrode layer is formed with a land in accordance with a black oxide treatment through a photo process, to dispose the luminescent structure on the land above the exposed part of the first transparent layer.

14. A lamp apparatus, comprising a transparent luminescent sheet provided at a windshield of a mobility apparatus, wherein:
   the transparent luminescent sheet comprises:
      a first transparent layer and a second transparent layer having transparency;
      an electrode layer stacked on the first transparent layer, the electrode layer having conductivity and comprising a luminescent structure; and
      a clear layer having transparency and being stacked to cover the electrode layer such that the clear layer is filled between the electrode layer and the second transparent layer, and
   the first transparent layer is bonded to the windshield,
   wherein a part of the electrode layer is subjected to an etching process to expose a part of the first transparent layer, and
   wherein the electrode layer is formed with a land in accordance with a black oxide treatment through a photo process, to dispose the luminescent structure on the land above the exposed part of the first transparent layer.

15. The lamp apparatus according to claim 14, wherein a light shield configured to shield light is provided at the second transparent layer.

* * * * *